US006778408B2

(12) United States Patent
Yang

(10) Patent No.: US 6,778,408 B2
(45) Date of Patent: Aug. 17, 2004

(54) COMPUTER HAVING AN IMPROVED CASING STRUCTURE

(75) Inventor: Chang-hwan Yang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 10/166,390

(22) Filed: Jun. 11, 2002

(65) Prior Publication Data

US 2003/0107880 A1 Jun. 12, 2003

(30) Foreign Application Priority Data

Dec. 6, 2001 (KR) .................................. 10-2001-0077128

(51) Int. Cl.7 .............................. H05K 7/14; H05K 7/18
(52) U.S. Cl. ..................... 361/796; 361/754; 361/755; 361/759; 361/801; 361/683
(58) Field of Search ............................ 361/754, 755, 361/759, 796, 801, 683, 685, 752, 753, 725, 726, 727

(56) References Cited

U.S. PATENT DOCUMENTS

| 1,937,942 A | * | 12/1933 | Briggs ............................ 70/81 |
| 4,736,332 A | * | 4/1988 | Crease ........................ 361/681 |
| 5,495,389 A | * | 2/1996 | Dewitt et al. ................ 361/683 |
| 5,877,938 A | * | 3/1999 | Hobbs et al. ............... 361/724 |
| 6,038,892 A | * | 3/2000 | Schmitt ........................... 70/78 |
| 6,040,978 A | * | 3/2000 | Spencer ...................... 361/683 |
| 6,108,196 A | * | 8/2000 | Jung ........................... 361/683 |
| 6,544,061 B1 | * | 4/2003 | Yasufuku et al. ........... 439/310 |
| 2003/0026072 A1 | * | 2/2003 | Hrehor et al. .............. 361/683 |

FOREIGN PATENT DOCUMENTS

| JP | 2-149078 | 12/1990 |
| JP | 4-265384 | 9/1992 |
| JP | 3026211 | 4/1996 |
| JP | 3041889 | 7/1997 |
| JP | 3075121 | 11/2000 |
| KR | 142736 | 4/1998 |
| KR | 1999-012219 | 4/1999 |

* cited by examiner

Primary Examiner—David Nelms
Assistant Examiner—Thanh Y. Tran
(74) Attorney, Agent, or Firm—Staas & Halsey LLP

(57) ABSTRACT

A computer includes a main casing having an opening to accommodate a plurality of hardware components, a movable casing rotatably combined to the main casing to cover and uncover the opening of the main casing, and a stopper located on one of the main casing and the movable casing. The stopper rotates between a stop position, at which the stopper prevents the movable casing from closing the opening at a predetermined angle, and a withdrawal position at which the stopper allows the movable casing to close the opening. Thus, the movable casing rotatably combined to the main casing, is stopped from closing the opening of the main casing while a casing of the computer is opened to replace or repair hardware components, thereby preventing accidents.

24 Claims, 10 Drawing Sheets

COMPUTER HAVING AN IMPROVED CASING STRUCTURE

CROSS-REFERENCE TO RELATED APPLICATIONS

This application claims the benefit of Korean Application No. 2001-77128, filed Dec. 6, 2001, in the Korean Intellectual Property Office, the disclosure of which is incorporated herein by reference.

BACKGROUND OF THE INVENTION

1. Field of the Invention

The present invention relates in general to a computer, and more particularly, to a computer having an improved casing structure.

2. Description of the Related Art

Generally, a computer is placed on a table. However, the table may have limited space and thus, a user may want a computer that occupies a small space and has a casing structure convenient to replace or repair hardware components of the computer. Consequently, arbitrary closing of the casing structure during replacement or repair of the hardware components may disturb the replaced or repaired work and cause accidents. Therefore, to meet a user's demand, there has been proposed a computer occupying a small space and having a casing structure convenient to replace or repair hardware components.

SUMMARY OF THE INVENTION

Accordingly, it is an object of the present invention to provide a computer in which a movable casing rotatably combined to a main casing is stopped from being closed arbitrarily while a casing is opened to replace or repair hardware components.

Additional objects and advantages of the invention will be set forth in part in the description which follows and, in part, will be obvious from the description, or may be learned by practice of the invention.

The foregoing and other objects of the present invention are achieved by providing a computer including a main casing having an opening to accommodate a plurality of hardware components, a movable casing rotatably combined to the main casing to cover and uncover the opening of the main casing, and a stopper located on one of the main casing and the movable casing. The stopper rotates between a stop position, at which the stopper prevents the movable casing from closing the opening at a predetermined angle, and a withdrawal position at which the stopper allows the movable casing to close the opening.

According to an aspect of the invention, the stopper is rotatably located on the main casing transverse to a rotation direction of the movable casing, includes one end part protruding out of the main casing at the stop position, and is positioned at the inside of the main casing at the withdrawal position. The movable casing has a latch flange latched on the one end part of the stopper at the stop position.

According to an aspect of the invention, the computer further includes a power supply in the main casing, wherein the stopper is rotatably combined to the power supply. Also, the computer includes a spring having a first end fixed onto the power supply and a second end supporting one side of the stopper to elastically restore the stopper to the stop position.

According to another aspect of the invention, an outside of the power supply has a spring through hole through which the second end of the spring protrudes, and an inside of the power supply has a fixing bracket to which the first end is fixed.

According to another aspect of the invention, the power supply has stop projections including a first stop projection adjacent to the stopper to prevent the stopper from rotating beyond the stop position, and a second stop projection opposite to the first projection to prevent the stopper from rotating beyond the withdrawal position.

According to yet another aspect of the invention, the stopper includes a handling lever opposite to the one end part thereof, and a plate of the power supply has a recess part at a position corresponding to the handling lever.

BRIEF DESCRIPTION OF THE DRAWINGS

These and other objects and advantages of the invention will become apparent and more appreciated from the following description of the preferred embodiments, taken in conjunction with the accompanying drawings of which.

DETAILED DESCRIPTION OF THE PREFERRED EMBODIMENTS

Figure 1:
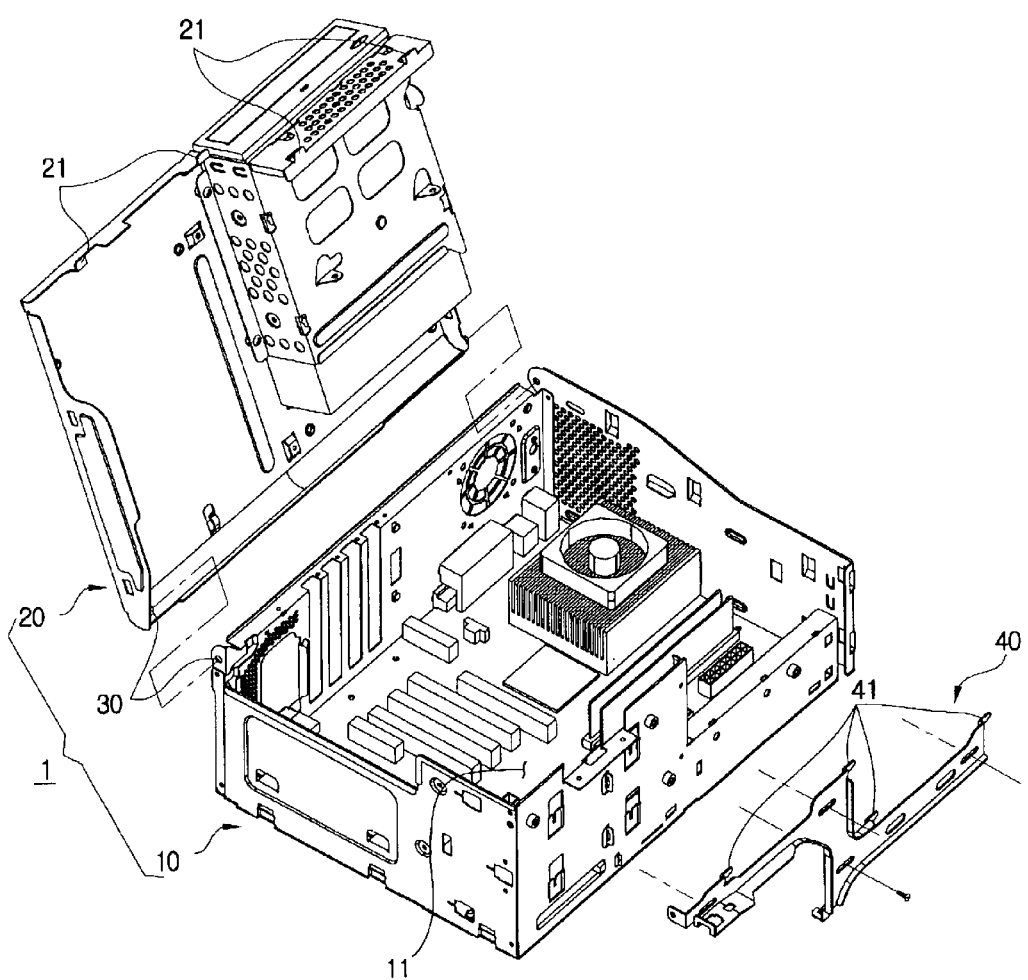
FIG. 1 is an exploded perspective view of a computer.

Reference will now be made in detail to the present preferred embodiments of the present invention, examples of which are illustrated in the accompanying drawings, wherein like reference numerals refer to like elements throughout.

FIG. 1 shows a computer which has been proposed by the present applicant having a casing 1 including a main casing 10 having an upward opening 11 to accommodate a plurality of hardware components therein. The casing 1 also includes a movable casing 20 covering and uncovering the opening 11 and mounted with a hardware component on the inside thereof, a hinge part 30 located at a rear of the opening 11 to rotatably support the movable casing 20, and a latch member 40 by which the movable casing 20 is locked to and released from the main casing 10.

To open the casing 1, the latch member 40 coupled to the main casing 10, is moved from a locking position to a releasing position. Thereafter, hooks 41 located on the latch member 40 are released from hook holders 21 located on the main casing 20. Then, a user opens the casing 1 by turning the movable casing 20 around the hinge part 30 of the main casing 10, thereby performing the replacement or repair of the hardware components. Thus, the casing 1 is conveniently opened and closed without a screwdriver.

Figure 2:
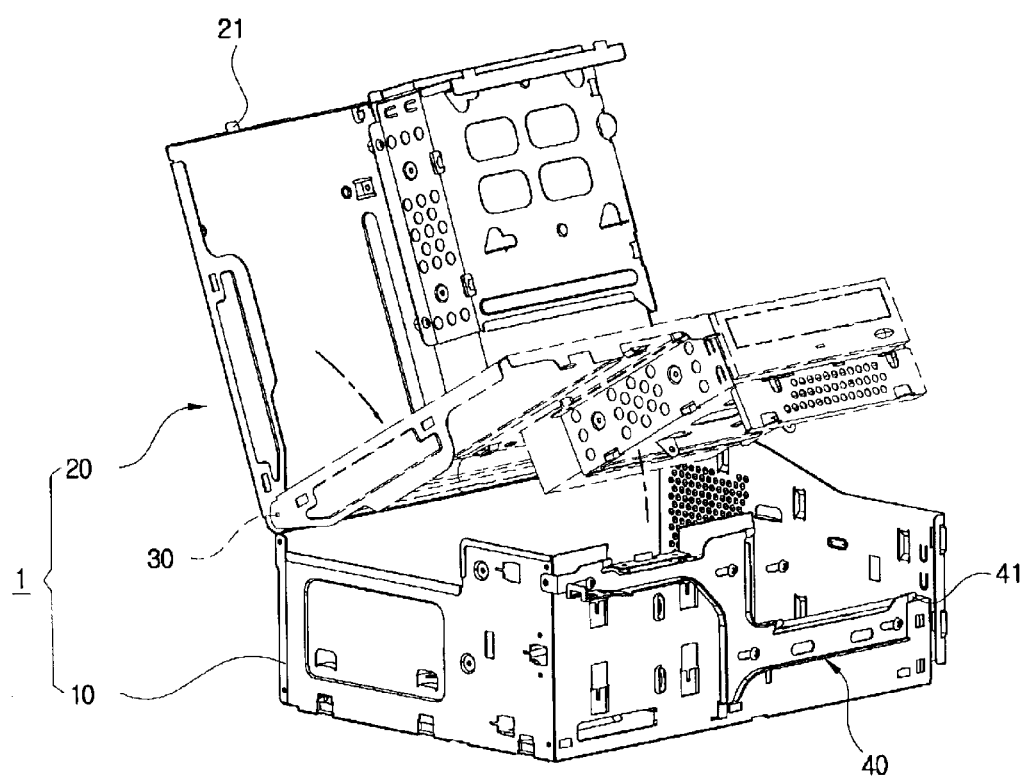
FIG. 2 shows an opening and closing operation of the computer in FIG. 1.

To replace or repair the hardware components when the casing 1 is opened by rotating the movable casing 20 against the main casing 10, the casing 1 is likely to be closed arbitrarily because the movable casing 20 easily moves in a closing position, as indicated by the arrow shown in FIG. 2.

Figure 3:
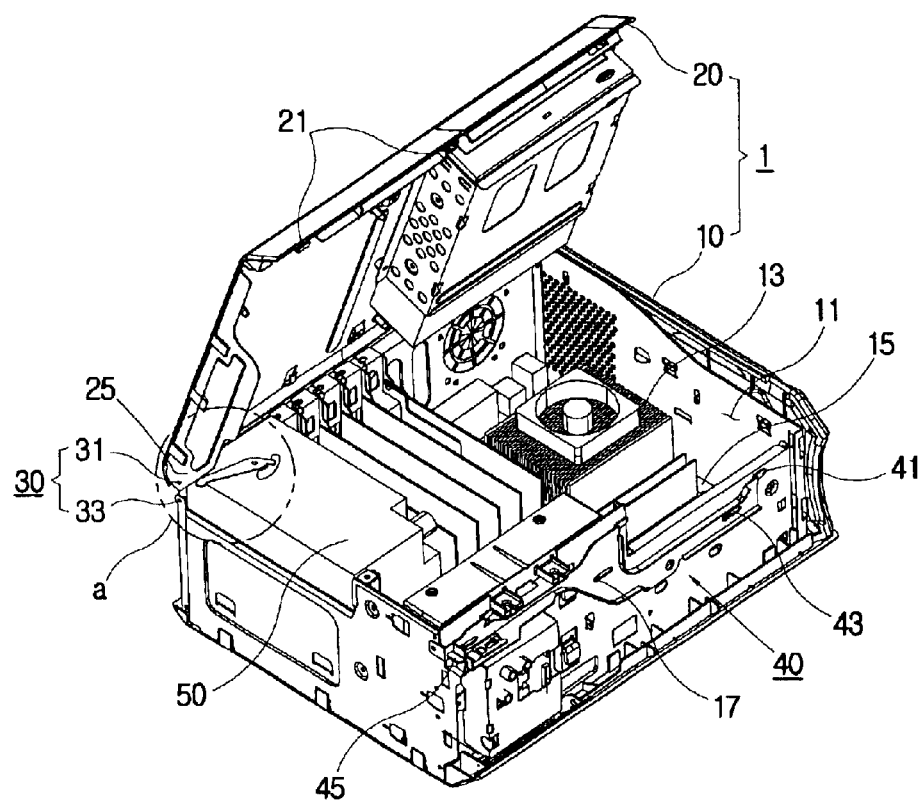
FIG. 3 is a perspective view of an opened computer, according to an embodiment of the present invention.

As shown in FIG. 3, the casing 1 of the computer includes the main casing 10 having the upward opening 11 to accommodate a plurality of hardware components therein. The casing 1 also includes the movable casing 20 covering and uncovering the opening 11 and mounted with a hardware component on the inside thereof, the hinge part 30 located at a rear of the opening 11 to rotatably support the movable casing 20, and the latch member 40 by which the movable casing 20 is locked to and released from the main casing 10.

The main casing 10 accommodates a main board 15 mounted with a CPU (central processing unit) 13, a RAM (Random Access Memory), and a power supply 50 to supply electric power to all of the hardware components including the main board 15. The front of the main casing 10 has a plurality of guiding projections 17 protruding therefrom and coupled to the latch member 40. Rear corners, on opposite sides of the main casing 10, include a pair of hinge pin accommodating parts 33 which are coupled to a pair of hinge pins 31 of the movable casing 20.

The movable casing 20 includes a plurality of hook holders 21 protruding therefrom and bent frontward, the hinge pins 31 protruding from the rear corners on opposite sides thereof, and a latch flange 25 latched on a protruding part 61 of a stopper 60. The stopper 60 is described below (see FIG. 4).

The plurality of hook holders 21 are latched to and released from hooks 41 of the latch member 40, thereby allowing the movable casing 20 to be locked to and released from the main casing 10.

The latch member 40 also has an elongated hole 43 to accommodate the guiding projections 17 and a grip part 45 located at one end part thereof.

The hooks 41 protrude from the latch member 40 and are latched to and released from the hook holders 21 of the movable casing 20, thereby allowing the movable casing 20 to be locked to and released from the main casing 10.

Figure 4:
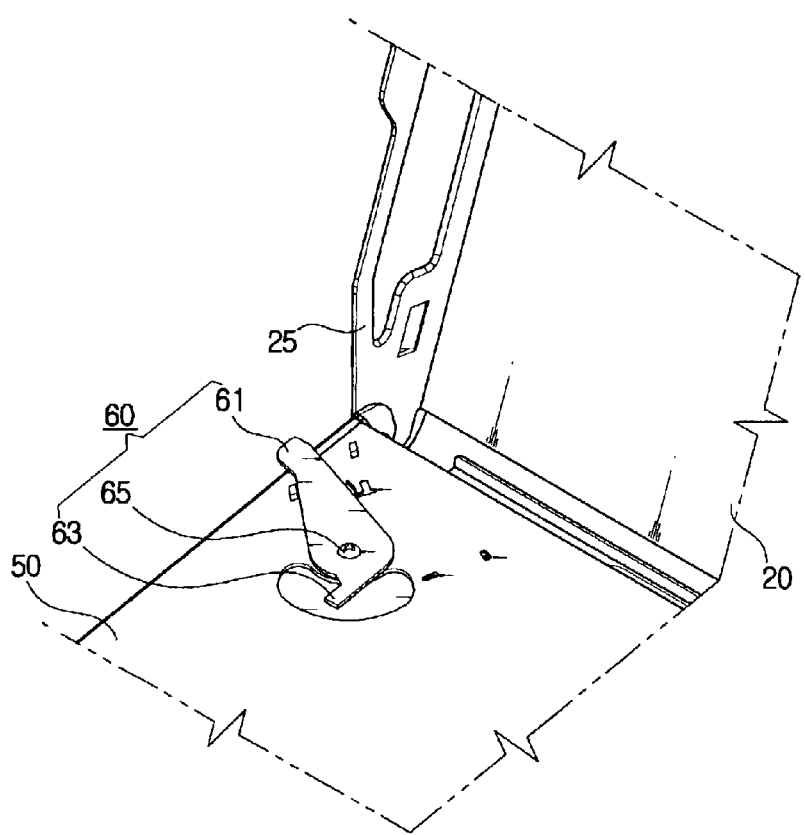
FIG. 4 is an enlarged perspective view of a dotted circle "a" as illustrated in FIG. 3.

As shown in FIGS. 3 and 4, the main casing 10 includes a stopper 60 to stop the movable casing 20 from rotating from an open position to a closed position. The stopper 60 is located on the power supply 50 in the main casing 10, but may be located in the movable casing 20.

The stopper 60 is made of a plate-shaped metal to maintain a weight of the movable casing 20 and has a protruding part 61 protruding beyond the main casing 10 at a stop position. The stopper 60 also has a handling lever 63 which is incorporated with the protruding part 61 and disposed opposite to the protruding part 61. The stopper 60 has a screw 65 rotatably combining the stopper 60 with the power supply 50 and perpendicular to a rotation direction of the movable casing 20. The screw 65 is employed as a rotation shaft.

Figure 6:
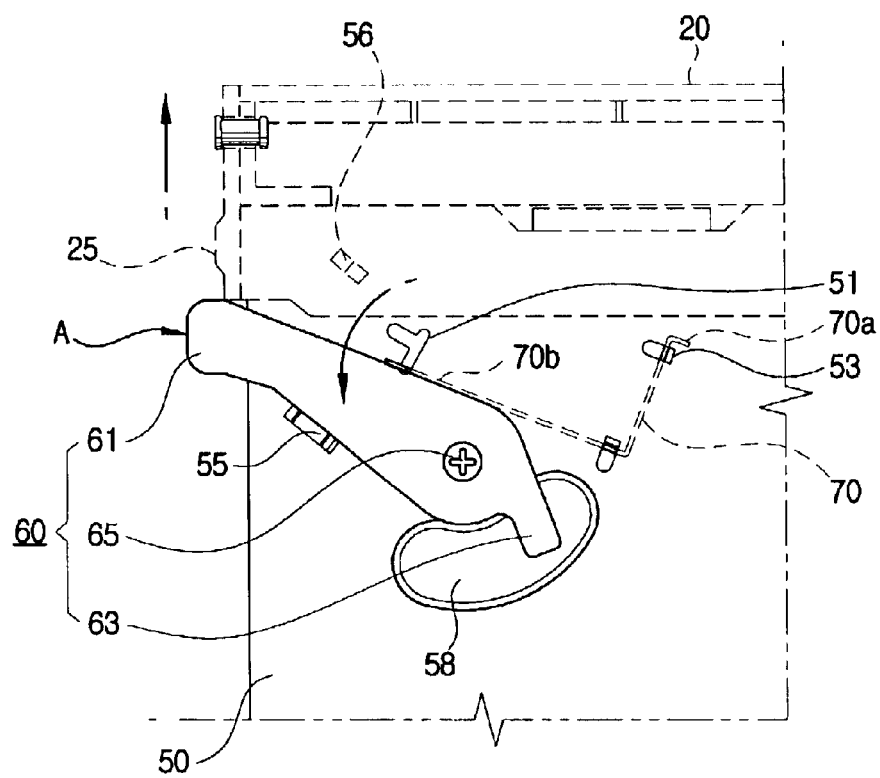
FIGS. 6-10 show operations of a stopper of the computer shown in FIG. 3.
Figure 7:
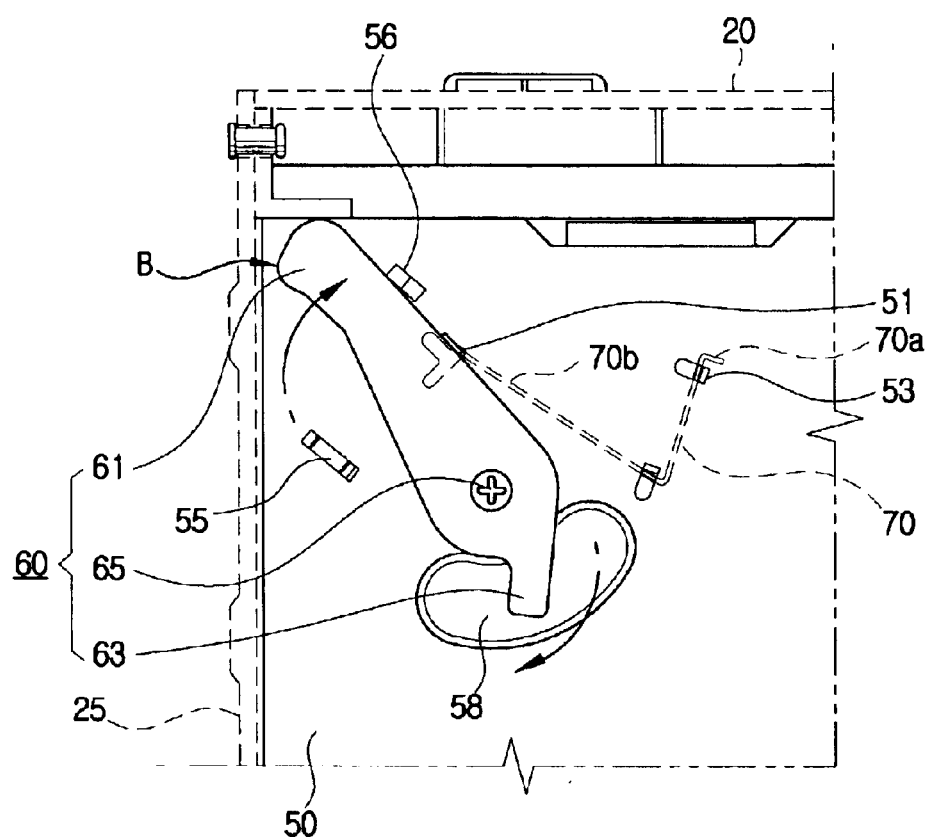
Figure 8:
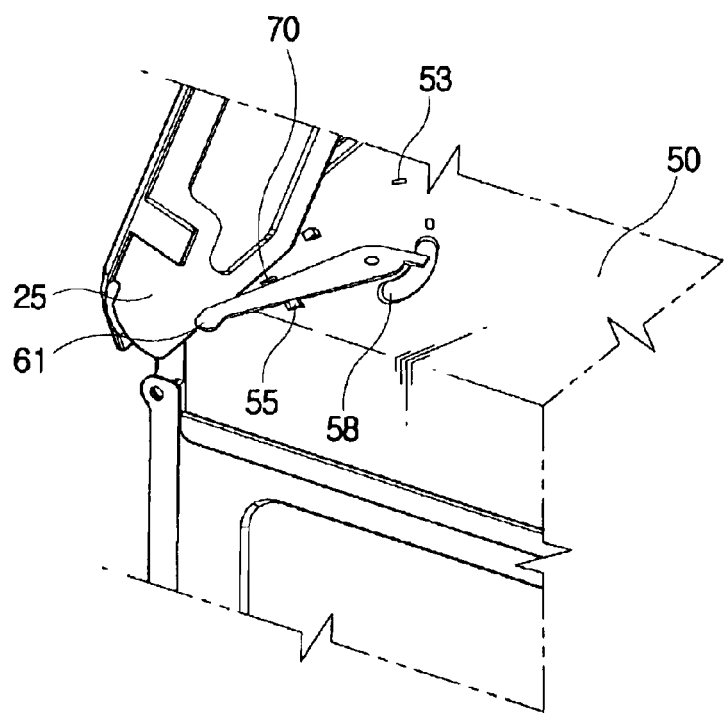

Thus, the stopper 60 rotates between the stop position at which the stopper 60 prevents the movable casing 20 from moving down to close the opening 11 (refer to "A" of FIG. 6), and a withdrawal position at which the stopper 60 allows the movable casing 20 to close the opening 11 (refer to "B" of FIG. 7). At the stop position, the protruding part 61 of the stopper 60 protrudes beyond the main casing 10 and is latched on the latch flange 25 of the movable casing 20, thereby stopping the movable casing 20 from covering the opening 11 while the replacing or repairing the hardware components (see FIG. 8) is performed. At the withdrawal position, the protruding part 61 of the stopper 60 is withdrawn into the main casing 10, thereby allowing the movable casing 20 to move down to cover the opening 11.

To move the stopper 60 to the stop position when the movable casing 20 uncovers the opening 11, a spring 70 elastically restores the stopper 60 to the stop position.

Figure 5:
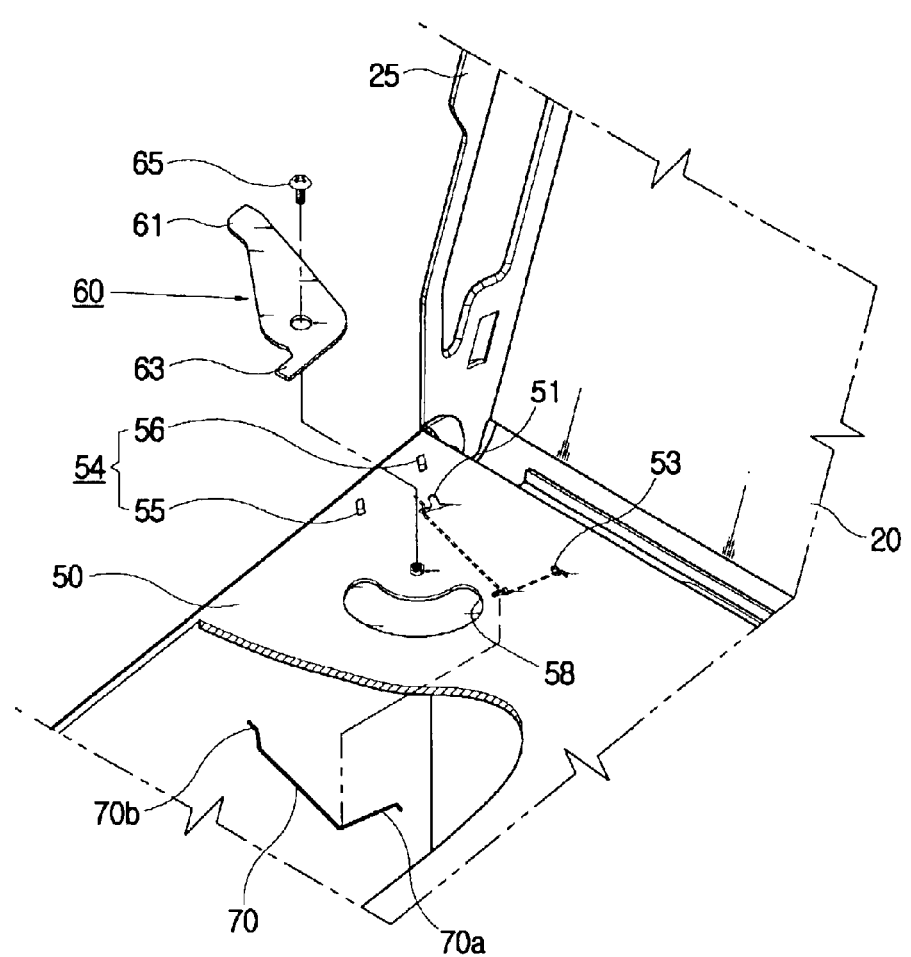
FIG. 5 is an exploded perspective view of FIG. 4.

As shown in FIG. 5, the spring 70 has a fixed end 70a fixed onto the power supply 50 and a free end 70b supporting one side of the stopper 60, thereby elastically restoring the stopper 60 to the stop position.

An outside of the power supply 50 has a spring through hole 51 through which the free end 70b of the spring 70 is exposed. An inside of the power supply 50 has a fixing bracket 53 to which the fixed end 70a is fixed.

The spring through hole 51 is formed by perforating a plate of the power supply 50 in a rotation course of the stopper 60. The fixing bracket 53 is formed by cutting and inwardly bending a part of the plate of the power supply 50. Therefore, the fixed end 70a of the spring 70 is fixed on the fixing bracket 53, and the free end 70b thereof is exposed through the spring through hole 51, thereby supporting the one side of the stopper 60 disposed on the power supply 50 to restore the stopper 60 to the stop position.

To prevent the stopper 60 from rotating beyond the stop position and the withdrawal position, stop projections 54 are used.

The stop projections 54 include a first stop projection 55 adjacent to the stopper 60 to stop the stopper 60 from rotating beyond the stop position, and a second stop projection 56 opposite to the first projection 55 to stop the stopper 60 from rotating beyond the withdrawal position.

Further, the plate of the power supply 50 has a recess part 58 located at a position corresponding to the handling lever 63 to facilitate handling the handling lever 63.

A process of opening the casing 1 to replace or repair the hardware components is described below.

First, the latch member 40 coupled to the main casing 10 is moved from a locking position to a releasing position (e.g., in a leftward direction as shown in FIG. 3). Then, the hooks 41 of the latch member 40 are released from the hook holders 21 of the main casing 20.

Figure 9:
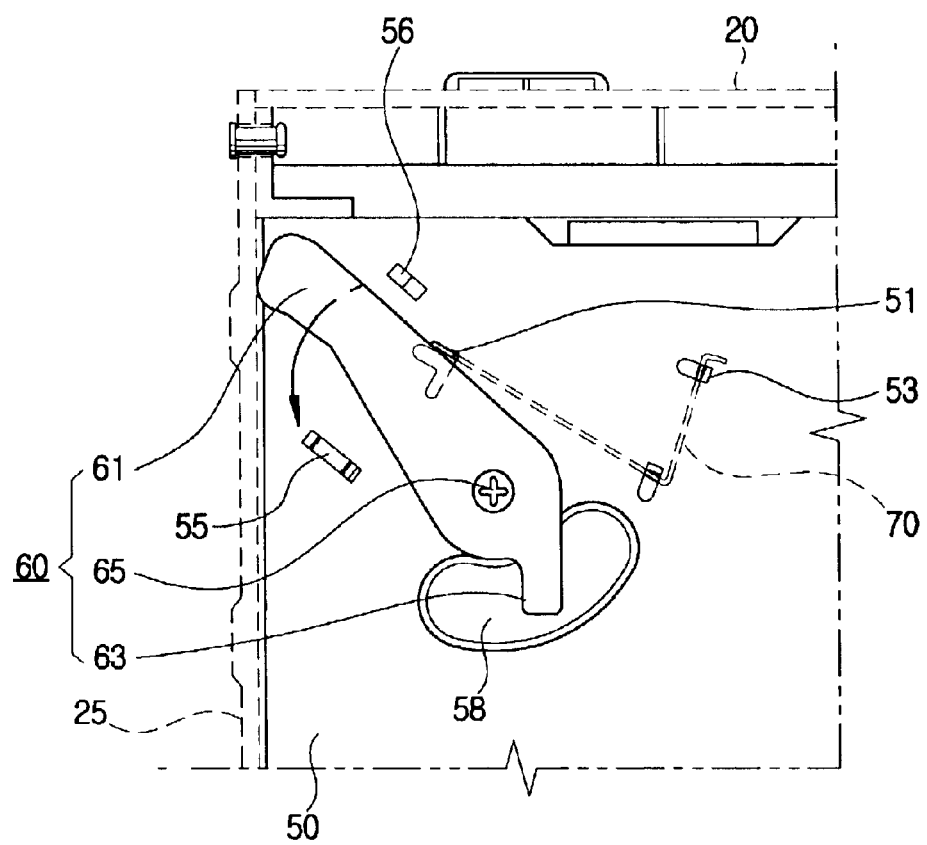

Thereafter, a user opens the casing 1 by upwardly moving the movable casing 20 around the hinge part 30 of the main casing 10. Simultaneously, the protruding part 61 (see FIG. 9) of the stopper 60, which is in contact with the latch flange 25 of the movable casing 20 (as shown in FIG. 6), moves to the stop position. Therefore, the latch flange 25 is latched to the protruding part 61 while the casing 1 is opened to replace or repair the hardware components. Thus, the movable casing 20 is prevented from closing the opening 11 (see FIG. 8).

A process of shutting the casing 1 after the hardware components are replaced or repaired, is described below.

First, the stopper 60 positioned at the stop position is turned clockwise on the screw 65 by clockwise-rotating the handling lever 63. Simultaneously, the protruding part 61 protruding beyond the main casing 10 at the stop position, is moved to an inside of the main casing 10 (see FIG. 7). Then, a user shuts the casing 1 by downwardly moving the movable casing 20 around the hinge part 30 of the main casing 10, and moves the latch member 40 from the releasing position to the locking position. Thus, the hooks 41 of the latch member 40 are locked to the hook holders 21 of the movable casing 20.

In the above embodiment, the stopper 60 is located on the power supply 50 in the main casing 10 and has a plate shape.

Figure 10:
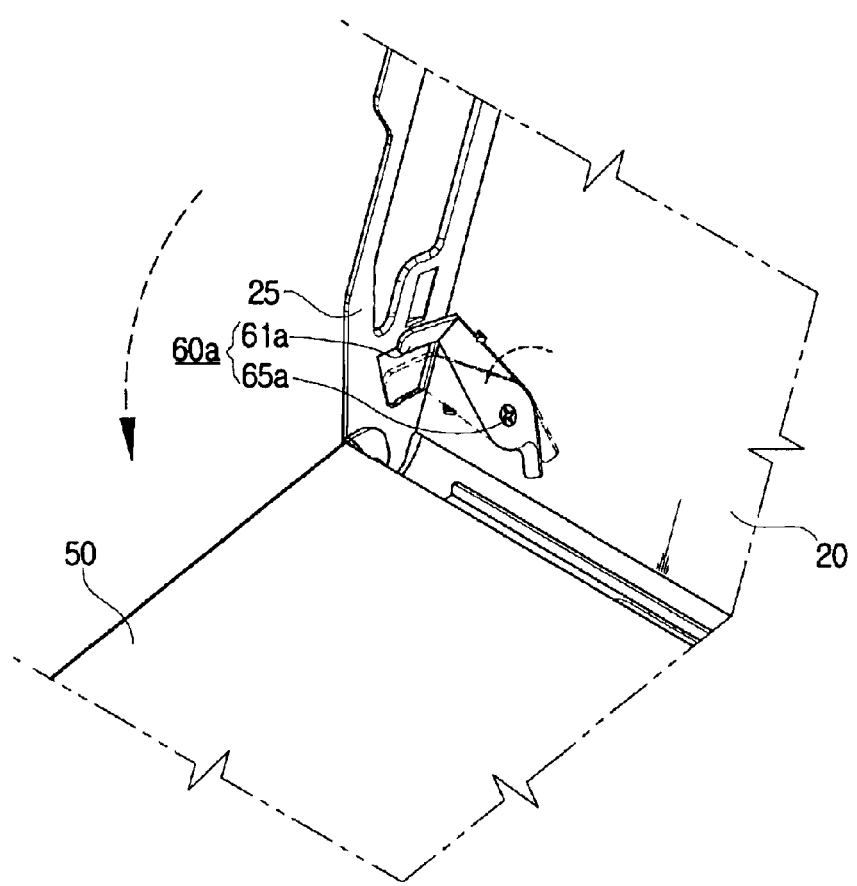

However, as shown in FIG. 10, a stopper 60a may be located on the inside of the movable casing 20 at a position adjacent to the hinge part 30. The stopper 60a would thereby include a first end having a screw 65a rotatably combined with the movable casing 20, and a second end (a protruding part 61a) supported on the plate of the power supply 50 to prevent the movable casing 20 from covering the opening 11.

As described above, the present invention includes a computer in which a movable casing rotatably combined to a main casing is stopped from closing an opening while a casing is opened to replace or repair hardware components, thereby preventing accidents.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A computer comprising:
    a main casing having an opening to accommodate a plurality of hardware components;
    a movable casing rotatably combined to the main casing to cover and uncover the opening of the main casing; and
    a stopper located on one of the main casing and the movable casing to rotate between a stop position, at which the stopper prevents the movable casing from closing the opening at a predetermined angle and keeps the opening opened at the predetermined angle, and a withdrawal position at which the stopper allows the movable casing to close the opening, and having a rotational axis perpendicular to a rotational axis of the movable casing.

2. The computer according to claim 1, wherein the stopper is rotatably formed on the main casing transverse to a rotation direction of the movable casing, said stopper comprising one end part protruding out of the main casing at the stop position and positioned inside of the main casing at the withdrawal position; and
    the movable casing comprises a latch flange latched on the one end part of the stopper at the stop position.

3. The computer according to claim 2, further comprising: a power supply in the main casing, wherein the stopper is rotatably combined to the power supply.

4. The computer according to claim 3, further comprising: a spring having a first end fixed onto the power supply and a second end supporting one side of the stopper, wherein said spring elastically restores the stopper to the stop position.

5. The computer according to claim 4, wherein an outside of the power supply has a spring through hole through which the second end of the spring protrudes, and an inside of the power supply has a fixing bracket to which the first end of the spring is fixed.

6. The computer according to claim 5, wherein the spring through hole is formed by perforating a plate of the power supply in a rotation course of the stopper.

7. The computer according to claim 5, wherein the fixing bracket is formed by cutting and inwardly bending a part of a plate of the power supply.

8. The computer according to claim 3, wherein the power supply comprises stop projections having a first stop projection adjacent to the stopper to prevent the stopper from rotating beyond the stop position, and a second stop projection opposite to the first projection to prevent the stopper from rotating beyond the withdrawal position.

9. The computer according to claim 2, wherein the stopper comprises a handling lever opposite to the one end part of the stopper, to rotate the stopper.

10. The computer according to claim 9, wherein the plate of the power supply has a recess part at a position corresponding to the handling lever, to ease rotation of the handling lever.

11. A computer comprising:
    a stopper located on one of a main casing and a movable casing to rotate between a stop position at which the stopper prevents the movable casing from closing an opening of the main casing at a predetermined angle and keeps the opening opened at the predetermined angle, and a withdrawal position at which the stopper allows the movable casing to close the opening, and having a rotational axis perpendicular to a rotational axis of the movable casing.

12. The computer according to claim 11, wherein the stopper is rotatably formed on the main casing transverse to a rotation direction of the movable casing, said stopper comprising one end part protruding out of the main casing at the stop position and positioned inside of the main casing at the withdrawing position.

13. The computer according to claim 12, wherein the stopper is rotatably combined to a power supply located in the main casing.

14. The computer according to claim 12, wherein the stopper is made of a plate-shaped metal to maintain a weight of the movable casing.

15. The computer according to claim 12, wherein the stopper comprises a handling lever opposite to the one end part of the stopper.

16. The computer according to claim 13, wherein the stopper comprises a screw rotatably combined with the power supply and perpendicular to a rotation direction of the movable casing, said screw being used as a rotation shaft.

17. The computer according to claim 13, further comprising:
    a spring having a first end fixed onto the power supply and a second end supporting one side of the stopper, wherein said spring elastically restores the stopper to the stop position.

18. The computer according to claim 17, wherein an outside of the power supply has a spring through hole through which the second end of the spring protrudes, and an inside of the power supply has a fixing bracket to which the first end of the spring is fixed.

19. The computer according to claim 18, wherein the spring through hole is formed by perforating a plate of the power supply in a rotation course of the stopper.

20. The computer according to claim 18, wherein the fixing bracket is formed by cutting and inwardly bending a part of a plate of the power supply.

21. The computer according to claim 13, wherein the power supply comprises stop projections having a first stop projection adjacent to the stopper to prevent the stopper from rotating beyond the stop position, and a second stop projection opposite to the first projection to prevent the stopper from rotating beyond the withdrawal position.

22. A computer having a movable casing and a main casing, said computer comprising:
    a stopper rotatably formed inside of the movable casing and having a rotational axis perpendicular to a rotational axis of the movable casing, to rotate between a stop position at which the stopper prevents the movable casing from closing an opening of the main casing and keeps the opening opened at a predetermined angle, and a withdrawal position at which the stopper allows the movable casing to close the opening.

23. The computer according to claim 22, wherein the stopper includes a protruding part supported by a power supply located in the main casing to prevent the movable casing from closing the opening of the main casing.

24. A computer comprising:

a main casing having an opening to accommodate a plurality of hardware components;

a movable casing rotatably combined to the main casing to cover and uncover the opening of the main casing; and a stopper located on one of the main casing and the movable casing to selectively maintain the movable casing at an opening position and to keep the opening opened at a predetermined angle, and having a rotational axis perpendicular to a rotational axis of the movable casing.

* * * * *